(12) United States Patent
Ost et al.

(10) Patent No.: US 12,524,447 B2
(45) Date of Patent: Jan. 13, 2026

(54) INTELLIGENT ASSISTANT SYSTEM FOR CONVERSATIONAL JOB SEARCH

(71) Applicant: Paradox, Inc., Scottsdale, AZ (US)

(72) Inventors: Stephen Derek Ost, Scottsdale, AZ (US); Zarina Shafeeva, Scottsdale, AZ (US)

(*) Notice: Subject to any disclaimer, the term of this patent is extended or adjusted under 35 U.S.C. 154(b) by 231 days.

(21) Appl. No.: 18/148,120

(22) Filed: Dec. 29, 2022

(65) Prior Publication Data

US 2023/0259541 A1 Aug. 17, 2023

Related U.S. Application Data

(60) Provisional application No. 63/268,105, filed on Feb. 16, 2022.

(51) Int. Cl.
*G06F 16/3329* (2025.01)
*G06F 40/205* (2020.01)

(52) U.S. Cl.
CPC ........ *G06F 16/3329* (2019.01); *G06F 40/205* (2020.01)

(58) Field of Classification Search
CPC .... G06F 16/3329; G06F 40/205; G06F 40/20; G06F 40/35
See application file for complete search history.

(56) References Cited

U.S. PATENT DOCUMENTS

| | | | |
|---|---|---|---|
| 2011/0055098 A1* | 3/2011 | Stewart | G06Q 10/00 705/321 |
| 2015/0295881 A1* | 10/2015 | Anderson | H04L 61/10 709/245 |
| 2018/0336528 A1* | 11/2018 | Carpenter | G06F 16/3334 |
| 2019/0019160 A1* | 1/2019 | Champaneria | G06N 5/04 |
| 2019/0034793 A1 | 1/2019 | Kataria et al. | |

(Continued)

FOREIGN PATENT DOCUMENTS

| | | |
|---|---|---|
| JP | 2000285124 A | 10/2000 |
| JP | 2013228978 A | 11/2013 |

(Continued)

OTHER PUBLICATIONS

International Search Report and Written Opinion for Application No. PCT/US2022/082552, mailed on Mar. 28, 2023, 19 Pages.

(Continued)

*Primary Examiner* — Anne L Thomas-Homescu
(74) *Attorney, Agent, or Firm* — James J. DeCarlo; Greenberg Traurig, LLP

(57) ABSTRACT

A computing system establishes a dialogue with a candidate computing system via an intelligent assistant. The intelligent assistant of the computing system prompts the candidate computing system for information regarding a job search. The prompting is performed in natural language. The computing system generates a query by applying natural language processing and natural language understanding technology to communications sent by the candidate computing system during the dialogue. The computing system compares the query against a database of job openings. The (Continued)

intelligent assistant of the computing system communicates potential job matches to the candidate computing system via the dialogue based on the comparing.

18 Claims, 5 Drawing Sheets

(56) References Cited

U.S. PATENT DOCUMENTS

| | | | | |
|---|---|---|---|---|
| 2020/0327505 | A1* | 10/2020 | Gomes | G06Q 10/1053 |
| 2020/0394615 | A1* | 12/2020 | Sethre | G06N 5/02 |
| 2022/0309469 | A1* | 9/2022 | Photos | G06Q 10/1053 |

FOREIGN PATENT DOCUMENTS

| | | | |
|---|---|---|---|
| JP | 2018077858 | A | 5/2018 |
| JP | 2019028646 | A | 2/2019 |
| JP | 2020098475 | A | 6/2020 |
| JP | 2022011519 | A | 1/2022 |
| TW | M479463 | U | 6/2014 |
| TW | 201941155 | A | 10/2019 |
| TW | 202117616 | A | 5/2021 |
| WO | 2013134871 | A1 | 9/2013 |

OTHER PUBLICATIONS

Office Action and Search Report from Taiwan Patent Application No. 112102198, dated May 2, 2024, 6 pages.
Office Action and Search Report from Taiwan Patent Application No. 112102198, dated Jan. 3, 2024, 17 pages.
Examination Report No. 1 for Australian Patent Application No. 2022441312 dated Mar. 14, 2025, 3 pages.
Office Action from Taiwan Patent Application No. 112102198, dated Feb. 11, 2025, 5 pages.
Office Action for Japanese Patent Application No. 2024-547020, mailed Jun. 27, 2025, 07 pages.
Office Action for Taiwan Patent Application No. 112102198, dated Jun. 26, 2025, 5 pages.
Office Action from BO Patent Application No. 0031-2023, dated Aug. 27, 2025, 8 pages.
Office Action for Canadian Patent Application No. 3,243,559, mailed Oct. 2, 2025, 4 pages.
Office Action for Japanese Patent Application No. 2024-547020, mailed Oct. 3, 2025, 03 pages.

* cited by examiner

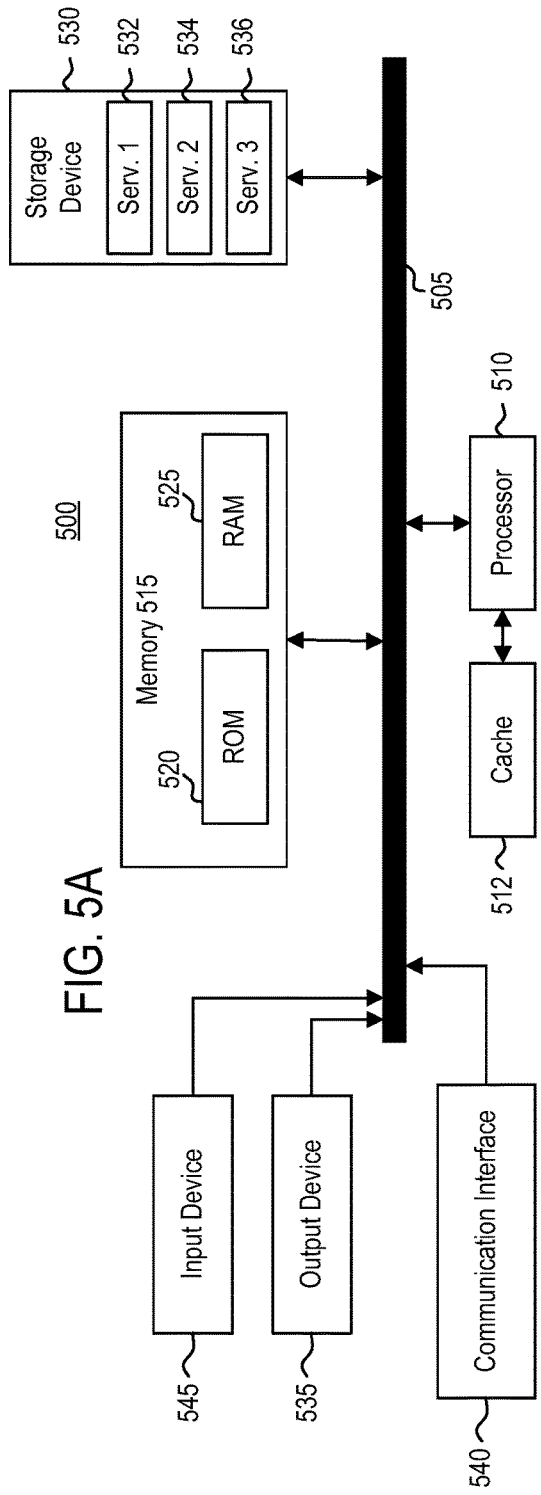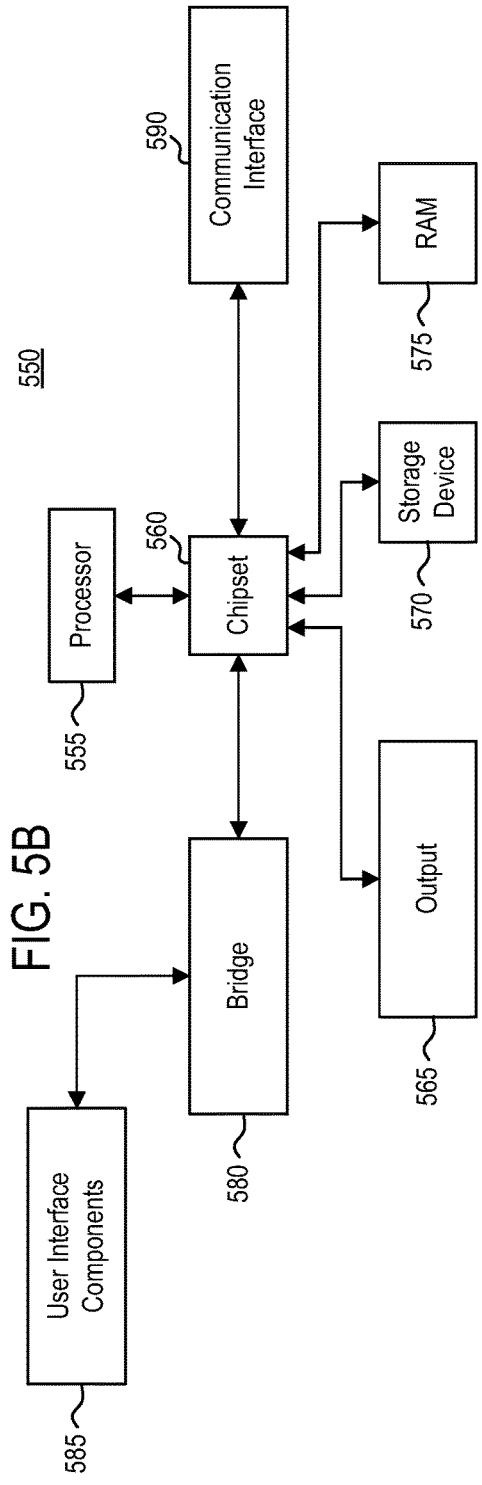

INTELLIGENT ASSISTANT SYSTEM FOR CONVERSATIONAL JOB SEARCH

CROSS-REFERENCE TO RELATED APPLICATIONS

This application claims priority to U.S. Application Ser. No. 63/268,105, filed Feb. 16, 2022, which is hereby incorporated by reference in its entirety.

FIELD OF THE DISCLOSURE

Embodiments disclosed herein generally related to an intelligent assistant system for delivering job results to a user in a natural language format.

BACKGROUND

The job search process is often a time-consuming and frustrating procedure for candidates to undergo. Traditional job boards and job sites typically do not possess powerful searching capabilities. Nor do traditional job boards and job sites have the ability to proactively answer a candidate's question about a potential position.

SUMMARY

In some embodiments, a method is disclosed herein. A computing system establishes a dialogue with a candidate computing system via an intelligent assistant. The intelligent assistant of the computing system prompts the candidate computing system for information regarding a job search. The prompting is performed in natural language. The computing system generates a query by applying natural language processing and natural language understanding technology to communications sent by the candidate computing system during the dialogue. The computing system compares the query against a database of job openings. The intelligent assistant of the computing system communicates potential job matches to the candidate computing system via the dialogue based on the comparing.

In some embodiments a non-transitory computer readable medium is disclosed herein. The non-transitory computer readable medium includes one or more sequences of instructions, which, when executed by one or more processors, causes a computing system to perform operations. The operations establishing, by the computing system, a dialogue with a candidate computing system via an intelligent assistant. The operations further include prompting, by the intelligent assistant of the computing system, the candidate computing system for information regarding a job search. The prompting is performed in natural language. The operations further include generating, by the computing system, a query by applying natural language processing and natural language understanding technology to communications sent by the candidate computing system during the dialogue. The operations further include comparing, by the computing system, the query against a database of job openings. The operations further include communicating, by the intelligent assistant of the computing system, potential job matches to the candidate computing system via the dialogue based on the comparing.

In some embodiments, a system is disclosed herein. The system includes a processor and a memory. The memory has programming instructions stored thereon, which, when executed by the processor, causes the computing system to perform operations. The operations include establishing a dialogue with a candidate computing system via an intelligent assistant. The operations further include prompting, by the intelligent assistant, the candidate computing system for information regarding a job search. The prompting is performed in natural language. The operations further include generating a query by applying natural language processing and natural language understanding technology to communications sent by the candidate computing system during the dialogue. The operations further include comparing the query against a database of job openings. The operations further include communicating, by the intelligent assistant, potential job matches to the candidate computing system via the dialogue based on the comparing.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 5A illustrates a system bus computing system architecture, according to example embodiments.

FIG. 5B illustrates a computer system having a chipset architecture, according to example embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Generally, the majority of candidate job searches typically begin with a candidate visiting a job board or career site. The candidate may enter structured search criteria, such as a job category, title, or location, in a text field or dropdown selection on the job board or career site. Such process can be frustrating to candidates for a myriad of reasons. For example, a user may need to individually review all job postings on the job board or career site to determine whether the user is even qualified to apply for the job opening. In another example, a user may not be able to generate complex search inquiries due to the searching or filtering limitations of the job board or career site. Such limitations of conventional systems may lead the candidate to seek the assistance of job recruiters, which could increase the overall recruiting cost for a business as a result of fees owed to the job recruiters.

One or more techniques described herein improve upon conventional job boards and career sites by providing the user with a more natural, conversational experience, such as one would expect when speaking with a recruiter about their job interests. To facilitate this, companies, entities, or organizations may utilize an intelligent assistant integration that leverages a combination of natural language processing (NLP) and natural language understanding (NLU) to facilitate or assist the candidate's job search. The intelligent assistant may facilitate natural language conversations with candidates to assist them in searching for jobs. For instance, a candidate can speak with the interactive assistant and ask "Do you have any sales jobs in Phoenix?" In response, the intelligent assistant may digest the query and deliver personalized job results to the candidate within seconds. As the conversation progresses, intelligent assistant may ask the candidate for more specific search criteria to ultimately present the candidate with the relevant jobs they want most. Further, thanks to natural language processing and natural language understanding, the intelligent assistant is able to handle complex queries that traditional filters and Boolean searches would be unable to process. In this manner, the intelligent assistant provides candidates with a recruiter-level quality search, while reducing the recruiter costs to organizations.

The term "user" or "candidate" as used herein includes, for example, a person or entity that owns a computing device or wireless device; a person or entity that operates or utilizes a computing device or wireless device; or a person or entity that is otherwise associated with a computing device or wireless device. It is contemplated that the term "user" or "candidate" is not intended to be limiting and may include various examples beyond those described.

Figure 1:
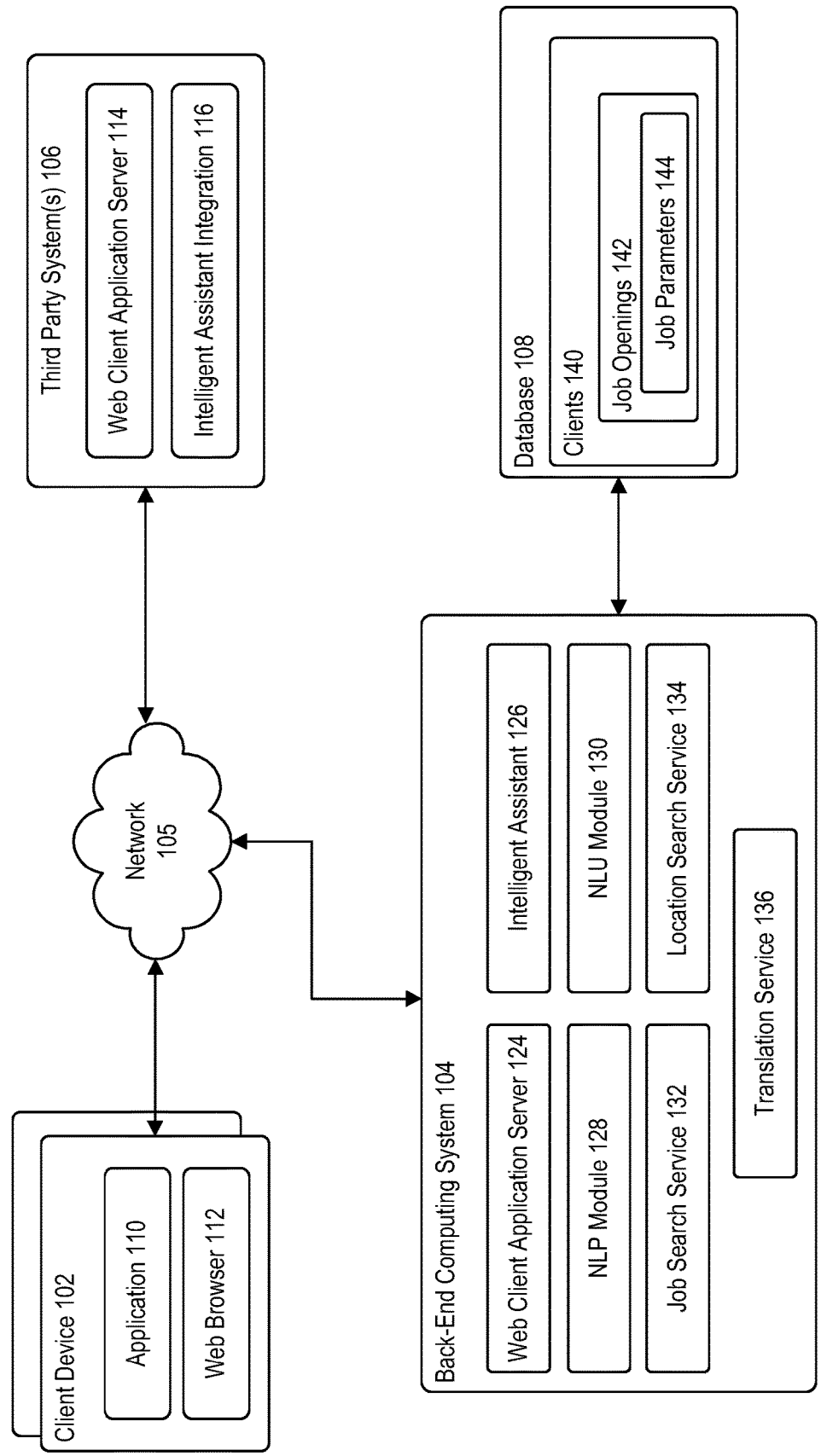
FIG. 1 is a block diagram illustrating a computing environment, according to one exemplary embodiment.

FIG. 1 is a block diagram illustrating computing environment 100, according to one embodiment. Computing environment 100 may include at least one or more client devices 102, a back-end computing system 104, and a third party system 106 communicating via network 105.

Network 105 may be of any suitable type, including individual connections via the Internet, such as cellular or Wi-Fi networks. In some embodiments, network 105 may connect terminals, services, and mobile devices using direct connections, such as radio frequency identification (RFID), near-field communication (NFC), Bluetooth™, low-energy Bluetooth™ (BLE), Wi-Fi™ ZigBee™, ambient backscatter communication (ABC) protocols, USB, WAN, or LAN. Because the information transmitted may be personal or confidential, security concerns may dictate one or more of these types of connection be encrypted or otherwise secured. In some embodiments, however, the information being transmitted may be less personal, and therefore, the network connections may be selected for convenience over security.

Network 105 may include any type of computer networking arrangement used to exchange data. For example, network 105 may be the Internet, a private data network, virtual private network using a public network and/or other suitable connection(s) that enables components in computing environment 100 to send and receive information between the components of computing environment 100.

Client device 102 may be operated by a user (e.g., a candidate). For example, client device 102 may be a mobile device, a tablet, a desktop computer, or any computing system having the capabilities described herein. Client device 102 may include at least application 110 and web browser 112. In some embodiments, application 110 may be a standalone application associated with third party system 106. In some embodiments, web browser 112 may allow access to a website associated with third party system 106. Client device 102 may access application 110 or web browser 112 to access content associated with third party system 106. In some embodiments, client device 102 may communicate over network 105 to request a webpage, for example, from web client application server 114 of third party system 106. For example, client device 102 may be configured to execute application 110 or web browser 112 to access content managed by web client application server 114. The content that is displayed to client device 102 may be transmitted from web client application server 114 to client device 102, and subsequently processed by application 110 or web browser 112 for display through a graphical user interface (GUI) of client device 102.

Third party system 106 may include at least web client application server 114 and intelligent assistant integration 116. Intelligent assistant integration 116 may allow third party system 106 to incorporate an intelligent assistant associated with back-end computing system 104 into a website associated with third party system 106 or content presented via application 110 associated with third party system 106. For example, an intelligent assistant may be incorporated into webpages of websites associated with third party system 106 (e.g., job boards, career sites, etc.), web-based platforms, messaging applications (e.g., Facebook Messenger, WhatsApp®, Signal, and the like), a mobile application (e.g., standalone application 110), a short message service (SMS) application, a multimedia messaging service (MMS) application, and the like. For example, intelligent assistant integration 116 may take the form of code that may be injected into the web code of a website hosted by web client application server 114. In another example, intelligent assistant integration 116 may take the form of code that may be injected into the code of application 110 executing on client device 102. Once injected into the web code of the website or code of application 110, an intelligent assistant supported by back-end computing system 104 may be incorporated into content provided by third party system 106. As such, when a user of client device 102 accesses application 110, application 110 may render an intelligent assistant associated with back-end computing system 104. In some embodiments, when a user of client device 102 requests a website from web client application server 114, web browser 112 may render an intelligent assistant associated with back-end computing system 104 within the website.

Back-end computing system 104 may include at least web client application server 124, intelligent assistant 126, natural language processing (NLP) module 128, and natural language understanding (NLU) module 130, job search service 132, location search service 134, and translation service 136. Each of intelligent assistant 126, NLP module 128, NLU module 130, job search service 132, and location search service 134 may be comprised of one or more software modules. The one or more software modules may be collections of code or instructions stored on a media (e.g., memory of back-end computing system 104) that represent a series of machine instructions (e.g., program code) that implements one or more algorithmic steps. Such machine instructions may be the actual computer code the processor of back-end computing system 104 interprets to implement the instructions or, alternatively, may be a higher level of coding of the instructions that is interpreted to obtain the actual computer code. The one or more software modules may also include one or more hardware components. One or more aspects of an example algorithm may be performed by the hardware components (e.g., circuitry) itself, rather than as a result of instructions.

In some embodiments, when client device 102 requests a website from web client application server 114 from third party system 106, web client application server 114 may provide web browser 112 of client device 102 with web code associated with the web page. For example, web browser 112 may transmit a hypertext transfer protocol (HTTP) request to web client application server 114. Web client application server 114 may read the request and transmit an HTTP message back to application 110. The response from web client application server 114 may include hypertext text markup language (HTML) code corresponding to the website. The HTML code may include the web code associated with intelligent assistant integration 116. Accordingly, when web browser 112 processes the HTML code for presentation of the web site to the user, a connection may be established between client device 102 and back-end computing system 104.

In some embodiments, when client device 102 accesses content associated with third party system 106 via application 110, application 110 may utilize one or more application programming interfaces (APIs) to access functionality of intelligent assistant integration 116. Accordingly, when application 110 establishes a connection with back-end computing system 104 via one or more APIs, a connection may be established between client device 102 and back-end computing system 104.

Intelligent assistant 126 may be configured to interact with a user. In some embodiments, intelligent assistant 126 may interact with the user when the user arrives at the webpage. For example, upon the web page rendering within web browser 112, web browser 112 may further render a graphical representation of intelligent assistant 126. Intelligent assistant 126 may receive messages from client device 102. Intelligent assistant 126 may utilize one or more natural language processing and natural language understanding techniques to determine a meaning of the user's message and the context of the user's message.

In some embodiments, intelligent assistant 126 may be configured to facilitate a conversation with the user. For example, a candidate may interact with intelligent assistant 126 by asking: "Do you have any sales jobs in Phoenix?" Intelligent assistant 126, through the various modules discussed below, may provide the user with personalized job results based on this query. In some embodiments, as the conversation progresses, intelligent assistant 126 can further prompt the candidate for more specific search criteria to ultimately present the candidate with the most relevant jobs. In this manner, intelligent assistant 126 may have the capability of facilitating a dialogue with candidates.

In some embodiments, the conversation directed by intelligent assistant 126 may be configured to mimic that of a recruiter. For example, intelligent assistant 126 may be trained to ask qualitative job attribute-based questions to better understand the candidate's best job fit. For example, intelligent assistant 126 may ask the candidate questions that include, but are not limited to: "do you see yourself as more of a people-person or an individually motivated person?" or "would you call yourself more big-picture or detail-oriented?"

In some embodiments, intelligent assistant 126 may further be configured to handle complex queries. For example, intelligent assistant 126 may support multiple searches at once through natural language such as "I would like to work in Phoenix or Los Angeles doing sales or marketing."

Intelligent assistant 126 may be configured to seamlessly combine the multiple requests and generate the best results to present to the candidate.

In some embodiments, intelligent assistant 126 may support a candidate seeking additional information about a potential opening. For example, a candidate may ask intelligent assistant 126: "how much experience do you need for this job?" Such additional functionality is often very useful in mediums where there is limited or no visual interface, such as SMS text messaging or voice assistant tools like Amazon Alexa.

In some embodiments, intelligent assistant 126 may utilize learned information from previous searches for other candidates to proactively recommend similar jobs to the target candidate.

In some embodiments, rather than the candidate initiating a dialogue with intelligent assistant 126, the candidate may simply upload their resume to intelligent assistant 126 for analysis. For example, based on the candidate's resume, intelligent assistant 126 may be configured to identify jobs relevant to the user based on one or more of experience, education, and location.

In some embodiments, intelligent assistant 126 can proactively offer new and highly recommended jobs in the candidate's area of interest or location, with no input required by the candidate.

In some embodiments, the dialogue or content provided by the candidate to intelligent assistant 126 may be provided to NLP module 128 and NLU module 130 for analysis. NLP module 128 may be configured to analyze and process documents uploaded by an end user via the website. In some embodiments, the user may upload a document when prompted by intelligent assistant 126. NLP module 128 may be configured to digest and extract information from the dialogue or content. For example, NLP module 128 may be trained to extract key terms, such as, but not limited to, information related to a potential job title (e.g., analyst), information related to a potential salary requirement, information related to a particular geographic location, and the like. In some embodiments, such as when the candidate has uploaded a resume, NLP module 128 may further be configured to extract terms related to one or more of employment history, education history, job skills, keywords, and the like.

NLU module 130 may work in conjunction with NLP module 128. For example, NLU module 130 may be configured to analyze the extracted terms, in addition to the surrounding terms, to understand a context of each term. For example, an "analyst" may correspond to a plurality of possible positions due to the breadth of the term "analyst." NLU module 130 may analyze any surrounding terms to determine the type of analyst job the candidate is seeking.

In some embodiments, NLP module 128 and NLU module 130 may work together to identify semantically similar search terms. For example, assume a candidate is interacting with intelligent assistant 126 and is seeking a cashier position. NLP module 128 and NLU module 130 may work in conjunction to determine that "sales associate" may be another term used for such position. In this manner, job search service 132 can perform a search query that covers a range of job results that would otherwise not be associated with each other based on "cashier" and "sales associate" terms individually.

Job search service 132 may be configured to search for relevant jobs based on the extracted information. For example, following NLP module 128 and NLU module 130 extracting key terms and determining the candidate's search intent, job search service 132 may utilize one or more searching algorithms that matches NLP/NLU extracted data or values with job openings stored in database 108. In some embodiments, the searching algorithms may be based on one or more of Euclidean distance, cosine similarity, Jaccard similarity, and the like. In some embodiments, the searching algorithm may retrieve jobs from database 108 and may transform the retrieved jobs into an inverted data structure for quick retrieval. In some embodiments, to rank the jobs, the searching algorithm may include one or more of BM25 similarity, divergence-from-randomness (DFR) similarity, divergence-from-independence (DFI) similarity, information based (IB) similarity, language model (LM) Dirichlet similarity, scripted similarity, and the like.

In some embodiments, back-end computing system 104 may further include location search service 134. Location search service 134 may be configured to determine or infer the candidate's location. For example, in some embodiments, location search service 134 may execute an algorithm that determines the candidate's location from their internet protocol address (if communicating via the Internet) or their area code (if communicating via SMS). Location search service 134 may then convert the candidate's determined location for geo-points. The location information determined by location search service 134 may be provided to job search service 132 as an additional search constraint.

In some embodiments, location search service 134 may further be configured to match the candidate's desired job location with normalized, exact locations based on latitude and longitude parameters to accurately identify the possible job's location in relation to the candidate's search. In some embodiments, if multiple locations are matched (e.g., "Glendale" may correspond to Glendale, Arizona and Glendale, California), location search service 134 may prompt intelligent assistant 126 to seek further information about the candidate. For example, location search service 134 ask the candidate to choose which specific location they meant out of the multiple locations that location search service 134 identified.

Although location search service 134 is shown as a component of back-end computing system 104, those skilled in the art understand that location search service 134 may be an external service accessed by back-end computing system 104 via one or more APIs.

In some embodiments, back-end computing system 104 may further include translation service 136. Translation service 136 may be configured to provide candidates with a multilingual search experience thus allowing candidates to interact with intelligent assistant 126 through a variety of languages. For example, translation service 136 may be configured to receive a multilingual search query and convert the multilingual search query into a candidate's desired language.

Although translation service 136 is shown as a component of back-end computing system 104, those skilled in the art understand that translation service 136 may be an external service accessed by back-end computing system 104 via one or more APIs.

Database 108 may be configured to store job opening information. In operations, job search service 132 may generate a query based on strings of search terms generated by NLP module 128 and NLU module 130. In some embodiments, job search service 132 may further generate the search query based on location information generated by location search service 134. Job search service 132 may compare the query against database 108.

In some embodiments, database 108 may be populated directly by one or more clients or entities. For example, a client or organization can upload job data through an external feed. In some embodiments, database 108 may be populated by back-end computing system 104. For example, back-end computing system 104 may utilize web crawler and/or screen scraping functionality to scrape a client's career site for their job data. Accordingly, as shown, database 108 may be organized by client (e.g., clients 140). Each client 140 may include job openings 142, with each job opening 142 having a plurality of job parameters 144. Exemplary job parameters 144 may include, but are not limited to, job title, job category, description, location, job type, status, and the like.

Figure 2:
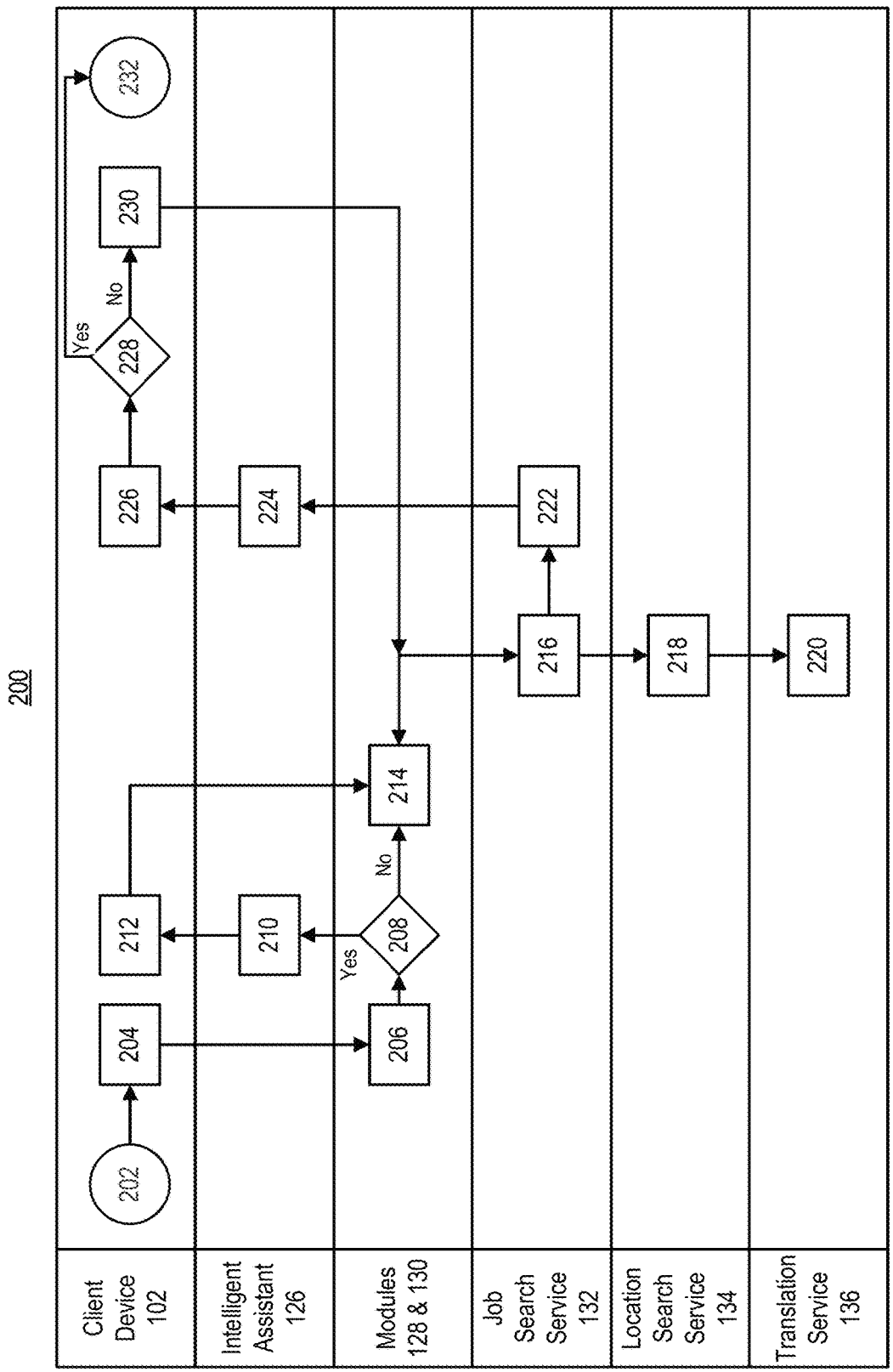
FIG. 2 is a block diagram illustrating an exemplary workflow for facilitating a job search using intelligent assistant, according to example embodiments.

FIG. 2 is a block diagram illustrating an exemplary workflow 200 for facilitating a job search using intelligent assistant 126, according to example embodiments.

As shown, workflow 200 may begin at step 202. At step 202, client device 102 may begin a conversational engagement. At step 204, client device 102 may send a message to intelligent assistant 126. In some embodiments, client device 102 may send a message to intelligent assistant 126 via intelligent assistant integration 116 on a third party application or website. Generally, the message can be in natural language form. For example, the candidate can send a message that recites: "I'm looking for a job." In another example, the candidate may be more specific and send a message that recites: "I'm looking for a sales assistant job in Sunnyvale." In another example, the candidate may provide what is considered a "complex" request. For example, the candidate may send a message that recites: "I'm looking for a sales assistant job in Sunnyvale or San Diego."

At step 206, intelligent assistant 126 may provide the message or messages to NLP module 128 and NLU module 130 for analysis. NLP module 128 and NLU module 130 may work in conjunction to process and understand the candidate's message, such that a query can be generated from the candidate's natural language message. For example, NLP module 128 may extract key terms, such as, but not limited to, information related to a potential job title (e.g., analyst), information related to a potential salary requirement, information related to a particular geographic location, and the like. NLU module 130 may analyze the extracted terms, in addition to the surrounding terms, to understand a context of each term.

At step 208, NLP module 128 and NLU module 130 may determine whether there is sufficient information present to generate a query from the candidate's message. For example, if the candidate only sends a message that recites—"I'm looking for a job"—such message may not be sufficient for NLP module 128 and NLU module 130 to generate a viable query.

If, at step 208, NLP module 128 and NLU module 130 determines that more information is needed from the candidate, then workflow 200 may proceed to step 210. At step 210, intelligent assistant 126 may prompt the candidate for additional job details to complete the search. For example, in natural language, intelligent assistant 126 may ask the candidate what type of job they are seeking. In another example, in natural language, intelligent assistant 126 may ask the candidate a geographic area in which the candidate is seeking a position.

At step 212, client device 102 may reply to intelligent assistant 126. For example, a candidate, via client device 102, may reply to prompts from intelligent assistant 126 in natural language.

At step 214, NLP module 128 and NLU module 130 may work in conjunction to process and understand the candidate's additional messages, such that a query can be generated from the candidate's natural language message. For example, NLP module 128 may extract key terms, such as, but not limited to, information related to a potential job title (e.g., analyst), information related to a potential salary requirement, information related to a particular geographic location, and the like. NLU module 130 may analyze the extracted terms, in addition to the surrounding terms, to understand a context of each term.

If, however, at step 208, NLP module 128 and NLU module 130 determine that there is sufficient information in the original message, then workflow 200 may similarly proceed to step 214 to perform those operations.

At step 216, job search service 132 may generate a query based on the extracted information. For example, job search service 132 may utilize one or more searching algorithms that matches NLP/NLU extracted data or values with job openings stored in database 108. In some embodiments, the searching algorithms may be based on one or more of Euclidean distance, cosine similarity, Jaccard similarity, and the like.

At step 222, job search service 132 may compare the query against database 108 to identify matching jobs. For example, based on the searching algorithms, job search service 132 may receive a plurality of potential job openings from database 108. Job search service 132 may process the search results and identify a subset of the plurality of potential job openings based on their relevancy score. In some embodiments, job search service 132 may remove any potential job openings that do not satisfy a threshold relevancy score.

At step 224, intelligent assistant 126 may receive job matching results from job search service 132 and may return the job matching results to client device 102. Intelligent assistant 126 may provide the job matching results to client device 102 in natural language format.

At step 226, client device 102 may receive the job matching results from intelligent assistant 126. At step 228, client device 102 may accept the results and apply to a job or revise the search phrase for new job specific data. If, at step 228, client device 102 chooses to accept the job results and selects a job from the job matching results, then workflow 200 may proceed to step 232. At step 232, the candidate may select the "apply now" prompt to end engagement with intelligent assistant 126.

If, however, at step 228, client device 102 indicates that a new search is required, then workflow 200 proceeds to step 230. At step 230, the candidate may revise the search phrase with additional job specific data, which may be provided to intelligent assistant 126. Workflow 200 may then revert to step 214 for further processing.

As shown, in some embodiments, workflow 200 may include steps 218 and 220. At step 218, location search service 134 may match the candidate's desired job location with normalized, exact locations based on latitude and longitude parameters to accurately identify the possible job's location in relation to the candidate's search.

At step 220, translation service 136 may translate the candidate's messages into a localized language for searching. For example, translation service 136 may be configured to receive a multilingual search query and convert the multilingual search query into a candidate's desired language.

Figure 3:
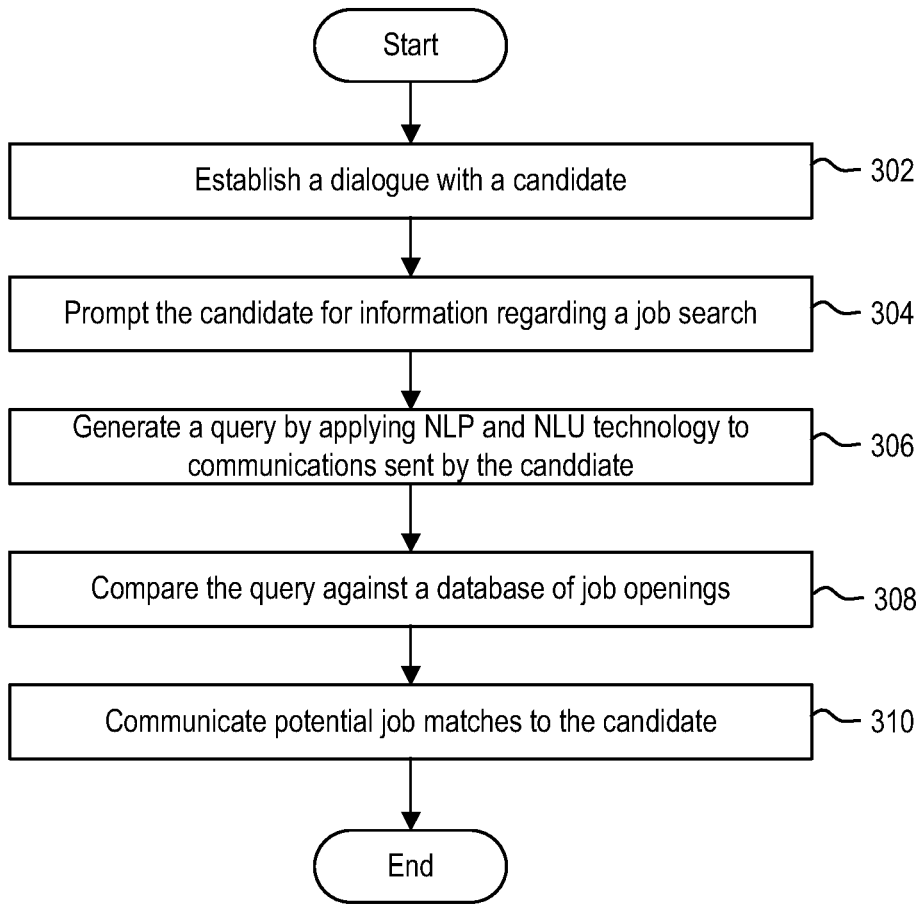
FIG. 3 is a flow diagram illustrating a method of executing a job search using a natural language intelligent assistant, according to example embodiments.

FIG. 3 is a flow diagram illustrating a method 300 of executing a job search using a natural language intelligent assistant, according to example embodiments. Method 300 may begin at step 302.

At step 302, back-end computing system 104 may establish a dialogue with a candidate. For example, client device 102 may send a message to intelligent assistant 126 of back-end computing system 104. In some embodiments, client device 102 may send a message to intelligent assistant 126 via intelligent assistant integration 116 on a third party application or website.

At step 304, back-end computing system 104 may prompt the candidate for information regarding a job search. For example, intelligent assistant 126 may interact with the candidate by asking the candidate for questions regarding their job search. Intelligent assistant 126 may prompt the user to send messages regarding the type of job they are interested in, the location they are interested in, a salary range, and the like.

At step 306, back-end computing system 104 may generate a query by applying NLP and NLU technology to communications sent by the candidate. For example, NLP module 128 and NLU module 130 may work in conjunction to process and understand the candidate's message, such that a query can be generated from the candidate's natural language message. For example, NLP module 128 may extract key terms, such as, but not limited to, information related to a potential job title (e.g., analyst), information related to a potential salary requirement, information related to a particular geographic location, and the like. NLU module 130 may analyze the extracted terms, in addition to the surrounding terms, to understand the context of each term.

At step 308, back-end computing system 104 may compare the query against database 108. For example, job search service 132 may compare the query against database 108 to identify matching jobs. Based on the searching algorithms, job search service 132 may receive a plurality of potential job openings from database 108. Job search service 132 may process the search results and identify a subset of the plurality of potential job openings based on their relevancy score. In some embodiments, job search service 132 may remove any potential job openings that do not satisfy a threshold relevancy score.

At step 310, back-end computing system 104 may communicate potential job matches to the candidate. For example, intelligent assistant 126 may provide the job matching results to client device 102 in natural language format.

Figure 4:
FIG. 4 illustrates an example view of a graphical user interface presenting a dialogue established between client device and intelligent assistant, according to example embodiments.

FIG. 4 illustrates an example view of a graphical user interface 400 (hereinafter "GUI 400") presenting a dialogue established between client device 102 and intelligent assistant 126, according to example embodiments. In some embodiments, GUI 400 may be a webpage presented in web browser 112 of client device 102. In some embodiments, GUI 400 may be a graphical user interface generated by application 110 executing on client device 102.

As illustrated, intelligent assistant 126 (e.g., "Olivia") may establish a dialogue with the candidate. Intelligent assistant 126 may communicate back and forth with the candidate in natural language format. Based on the candidate's message "Do you have any research jobs near White Plains, NY?", NLP module 128 and NLU module 130 may work in conjunction to generate a query that includes at least "research," "White Plains," and "New York." Job search service 132 may compare this query against database 108 to identify a listing of results. Intelligent assistant 126 may deliver those results to the candidate in the chat.

As those skilled in the art understand, and as discussed above, as the conversation progresses between the candidate and intelligent assistant 126, better job recommendations will be displayed. For instance, the candidate may say "I actually am thinking about moving to Scottsdale." At that point, intelligent assistant 126 will filter the jobs based on the provided location. The candidate can further state "I just graduated with a BA in UX Design" and intelligent assistant 126 will then recommend UX research roles in Scottsdale.

FIG. 5A illustrates an architecture of system bus computing system 500, according to example embodiments. One or more components of system 500 may be in electrical communication with each other using a bus 505. System 500 may include a processor (e.g., one or more CPUs, GPUs or other types of processors) 510 and a system bus 505 that couples various system components including the system memory 515, such as read only memory (ROM) 520 and random access memory (RAM) 525, to processor 510. System 500 can include a cache of high-speed memory connected directly with, in close proximity to, or integrated as part of processor 510. System 500 can copy data from memory 515 and/or storage device 530 to cache 512 for quick access by processor 510. In this way, cache 512 may provide a performance boost that avoids processor 510 delays while waiting for data. These and other modules can control or be configured to control processor 510 to perform various actions. Other system memory 515 may be available for use as well. Memory 515 may include multiple different types of memory with different performance characteristics. Processor 510 may be representative of a single processor or multiple processors. Processor 510 can include one or more of a general purpose processor or a hardware module or software module, such as service 1 532, service 2 534, and service 3 536 stored in storage device 530, configured to control processor 510, as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction with the system 500, an input device 545 can be any number of input mechanisms, such as a microphone for speech, a touch-sensitive screen for gesture or graphical input, keyboard, mouse, motion input, speech and so forth. An output device 535 (e.g., a display) can also be one or more of a number of output mechanisms known to those of skill in the art. In some instances, multimodal systems can enable a user to provide multiple types of input to communicate with system 500. Communication interface 540 can generally govern and manage the user input and system output. There is no restriction on operating on any particular hardware arrangement and therefore the basic features here may easily be substituted for improved hardware or firmware arrangements as they are developed.

Storage device 530 may be a non-volatile memory and can be a hard disk or other type of computer readable media that can store data that are accessible by a computer, such as magnetic cassettes, flash memory cards, solid state memory devices, digital versatile disks, cartridges, random access memories (RAMs) 525, read only memory (ROM) 520, and hybrids thereof.

Storage device 530 can include services 532, 534, and 536 for controlling the processor 510. Other hardware or software modules are contemplated. Storage device 530 can be connected to system bus 505. In one aspect, a hardware module that performs a particular function can include the software component stored in a computer-readable medium in connection with the necessary hardware components, such as processor 510, bus 505, output device 535 (e.g., a display), and so forth, to carry out the function.

FIG. 5B illustrates a computer system 550 having a chipset architecture, according to example embodiments. Computer system 550 may be an example of computer hardware, software, and firmware that can be used to implement the disclosed technology. System 550 can include one or more processors 555, representative of any number of physically and/or logically distinct resources capable of executing software, firmware, and hardware configured to perform identified computations. One or more processors 555 can communicate with a chipset 560 that can control input to and output from one or more processors 555. In this example, chipset 560 outputs information to output 565, such as a display, and can read and write information to storage device 570, which can include magnetic media, and solid-state media, for example. Chipset 560 can also read data from and write data to storage device 575 (e.g., RAM). A bridge 580 for interfacing with a variety of user interface components 585 can be provided for interfacing with chipset 560. Such user interface components 585 can include a keyboard, a microphone, touch detection and processing circuitry, a pointing device, such as a mouse, and so on. In general, inputs to system 550 can come from any of a variety of sources, machine generated and/or human generated.

Chipset 560 can also interface with one or more communication interfaces 590 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by one or more processors 555 analyzing data stored in storage device 570 or 575. Further, the machine can receive inputs from a user through user interface components 585 and execute appropriate functions, such as browsing functions, by interpreting these inputs using one or more processors 555.

It can be appreciated that example systems 500 and 550 can have more than one processor 510 or be part of a group or cluster of computing devices networked together to provide greater processing capability.

While the foregoing is directed to embodiments described herein, other and further embodiments may be devised without departing from the basic scope thereof. For example, aspects of the present disclosure may be implemented in hardware or software or a combination of hardware and software. One embodiment described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readable by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

The invention claimed is:

1. A method, comprising:
   establishing, by a computing system, a dialogue with a candidate computing system via an intelligent assistant, the intelligent assistant executing via one or more of:
      a third party software application executing on the candidate computing system, wherein the intelligent assistant exists in the third party software application through first code injected into programming code of the third party software application, the intelligent assistant linking the candidate computing system to the computing system via one or more application programming interfaces, or
      a third party website caused to be displayed via a web browser executing on the candidate computing system, the third party website hosted by a web server, wherein the intelligent assistant exists in the third party website through second code injected into web code of the third party website, the intelligent assistant linking the candidate computing system to the computing system via the one or more application programming interfaces;
   prompting, by the intelligent assistant of the computing system, the candidate computing system for information regarding a job search, wherein the prompting is performed in natural language;
   generating, by the computing system, a query for identifying potential job matches based on the dialogue, the generating comprising:
      applying natural language processing and natural language understanding technology to communications sent by the candidate computing system during the dialogue,
      extracting key terms based on an analysis by the natural language processing and the natural language understanding technology, the key terms related to desired job constraints defined by the candidate computing system,
      identifying additional terms that are semantically similar to the extracted key terms but are not present in the communications sent by the candidate computing system, and
      building the query, wherein the query comprises the extracted key terms and the identified additional terms that are semantically similar to the extracted key terms;
   comparing, by the computing system, the query against a database of job openings; and
   communicating, by the intelligent assistant of the computing system, potential job matches to the candidate computing system via the dialogue based on the comparing.

2. The method of claim 1, further comprising:
   receiving, by the computing system from the candidate computing system, a response to a prompt generated by the intelligent assistant;
   determining, by the computing system, that there is an ambiguity in the response to the prompt; and
   further prompting, by the intelligent assistant of the computing system, the candidate computing system to clarify the ambiguity.

3. The method of claim 1, further comprising:
   inferring, by the computing system, a location of the candidate computing system based on an internet protocol address of the candidate computing system.

4. The method of claim 1, further comprising:
   inferring, by the computing system, a location of the candidate computing system based on an area code associated with a phone number of the candidate computing system.

5. The method of claim 1, further comprising:
   receiving, by the intelligent assistant of the computing system, further information related to a job interest;
   based on the receiving, updating, by the computing system, the query by including the further information related to the job interest; and
   updating, by the computing system, the potential job matches based on the updated query.

6. The method of claim 1, further comprising:
   receiving, by the intelligent assistant of the computing system, a request for additional information about a position included in the potential job matches;
   parsing, by the computing system, the request by applying the natural language processing and the natural language understanding technology to the request; and
   retrieving, by the computing system, an answer to the request based on the parsing.

7. A non-transitory computer readable medium comprising instructions which, when executed by one or more processors, cause a computing system to perform operations, comprising:
   establishing, by the computing system, a dialogue with a candidate computing system via an intelligent assistant, the intelligent assistant executing via one or more of:
      a third party software application executing on the candidate computing system, wherein the intelligent assistant exists in the third party software application through first code injected into programming code of the third party software application, the intelligent assistant linking the candidate computing system to the computing system via one or more application programming interfaces, or
      a third party website caused to be displayed via a web browser executing on the candidate computing system, the third party website hosted by a web server, wherein the intelligent assistant exists in the third party website through second code injected into web code of the third party website, the intelligent assistant linking the candidate computing system to the computing system via the one or more application programming interfaces;
   prompting, by the intelligent assistant of the computing system, the candidate computing system for information regarding a job search, wherein the prompting is performed in natural language;

generating, by the computing system, a query for identifying potential job matches based on the dialogue, the generating comprising:
applying natural language processing and natural language understanding technology to communications sent by the candidate computing system during the dialogue,
extracting key terms based on an analysis by the natural language processing and the natural language understanding technology, the key terms related to desired job constraints defined by the candidate computing system,
identifying additional terms that are semantically similar to the extracted key terms but are not present in the communications sent by the candidate computing system, and
building the query, wherein the query comprises the extracted key terms and the identified additional terms that are semantically similar to the extracted key terms;
comparing, by the computing system, the query against a database of job openings; and
communicating, by the intelligent assistant of the computing system, potential job matches to the candidate computing system via the dialogue based on the comparing.

8. The non-transitory computer readable medium of claim 7, further comprising:
receiving, by the computing system from the candidate computing system, a response to a prompt generated by the intelligent assistant;
determining, by the computing system, that there is an ambiguity in the response to the prompt; and
further prompting, by the intelligent assistant of the computing system, the candidate computing system to clarify the ambiguity.

9. The non-transitory computer readable medium of claim 7, further comprising:
inferring, by the computing system, a location of the candidate computing system based on an internet protocol address of the candidate computing system.

10. The non-transitory computer readable medium of claim 7, further comprising:
inferring, by the computing system, a location of the candidate computing system based on an area code associated with a phone number of the candidate computing system.

11. The non-transitory computer readable medium of claim 7, further comprising:
receiving, by the intelligent assistant of the computing system, further information related to a job interest;
based on the receiving, updating, by the computing system, the query by including the further information related to the job interest; and
updating, by the computing system, the potential job matches based on the updated query.

12. The non-transitory computer readable medium of claim 7, further comprising:
receiving, by the intelligent assistant of the computing system, a request for additional information about a position included in the potential job matches;
parsing, by the computing system, the request by applying the natural language processing and the natural language understanding technology to the request; and
retrieving, by the computing system, an answer to the request based on the parsing.

13. A system, comprising:
one or more processors; and
a memory having programming instructions stored thereon, which, when executed by the one or more processors, causes the system to perform operations, comprising:
establishing a dialogue with a candidate computing system via an intelligent assistant, the intelligent assistant executing via one or more of:
a third party software application executing on the candidate computing system, wherein the intelligent assistant exists in the third party software application through first code injected into programming code of the third party software application, the intelligent assistant linking the candidate computing system to the system via one or more application programming interfaces, or
a third party website caused to be displayed via a web browser executing on the candidate computing system, the third party website hosted by a web server, wherein the intelligent assistant exists in the third party website through second code injected into web code of the third party website, the intelligent assistant linking the candidate computing system to the computing system via the one or more application programming interfaces;
prompting, by the intelligent assistant, the candidate computing system for information regarding a job search, wherein the prompting is performed in natural language;
generating a query for identifying potential job matches based on the dialogue, the generating comprising:
applying natural language processing and natural language understanding technology to communications sent by the candidate computing system during the dialogue,
extracting key terms based on an analysis by the natural language processing and the natural language understanding technology, the key terms related to desired job constraints defined by the candidate computing system,
identifying additional terms that are semantically similar to the extracted key terms but are not present in the communications sent by the candidate computing system, and
building the query, wherein the query comprises the extracted key terms and the identified additional terms that are semantically similar to the extracted key terms;
comparing the query against a database of job openings; and
communicating, by the intelligent assistant, potential job matches to the candidate computing system via the dialogue based on the comparing.

14. The system of claim 13, wherein the operations further comprise:
receiving, from the candidate computing system, a response to a prompt generated by the intelligent assistant;
determining that there is an ambiguity in the response to the prompt; and
further prompting, by the intelligent assistant, the candidate computing system to clarify the ambiguity.

15. The system of claim 13, wherein the operations further comprise:
inferring a location of the candidate computing system based on an internet protocol address of the candidate computing system.

16. The system of claim 13, wherein the operations further comprise:
 inferring a location of the candidate computing system based on an area code associated with a phone number of the candidate computing system.

17. The system of claim 13, wherein the operations further comprise:
 receiving, by the intelligent assistant, further information related to a job interest;
 based on the receiving, updating the query by including the further information related to the job interest; and
 updating the potential job matches based on the updated query.

18. The system of claim 13, wherein the operations further comprise:
 receiving, by the intelligent assistant, a request for additional information about a position included in the potential job matches;
 parsing the request by applying the natural language processing and the natural language understanding technology to the request; and
 retrieving an answer to the request based on the parsing.

\* \* \* \* \*